Jan. 21, 1964   N. R. ROBINSON ETAL   3,118,593
FLUID FLOW MACHINE
Filed April 17, 1962   2 Sheets-Sheet 1
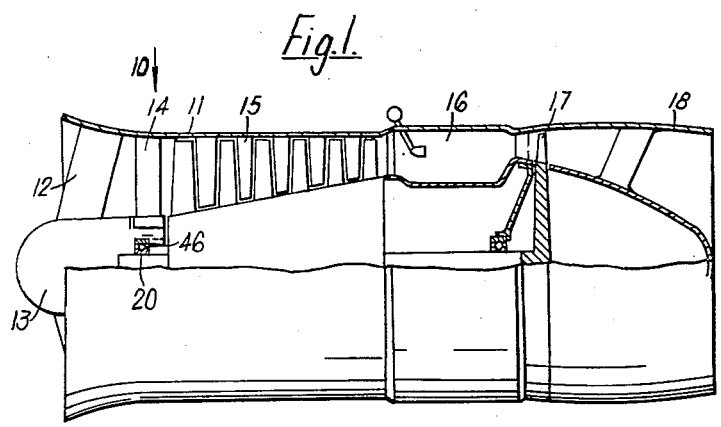
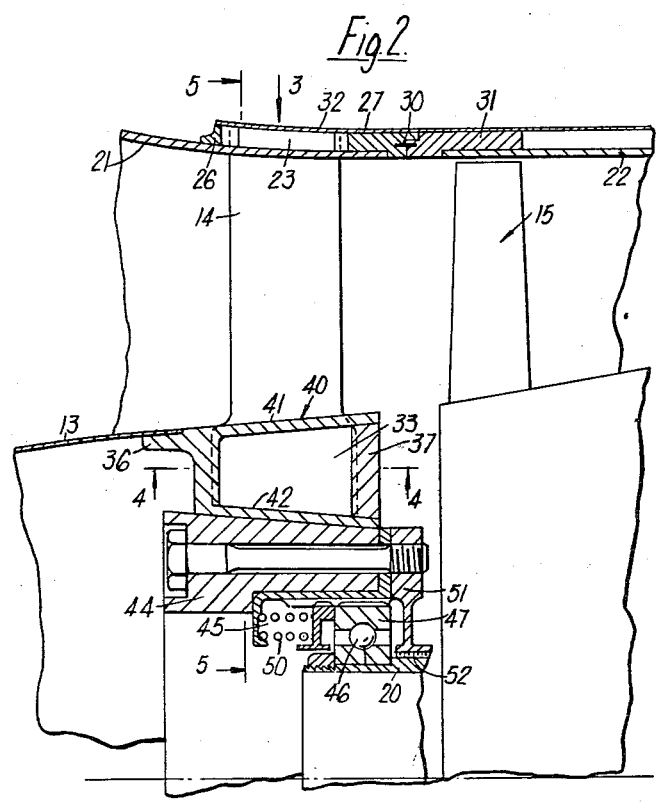
Inventors
Norman Robert Robinson
John Michael Storer Keen
By
Cushman, Darby & Cushman
Attorneys

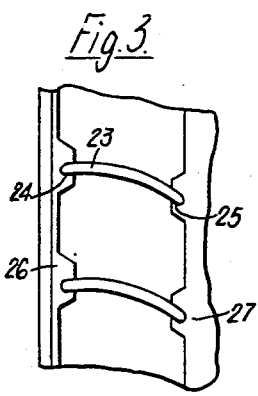
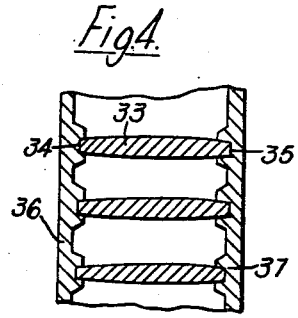
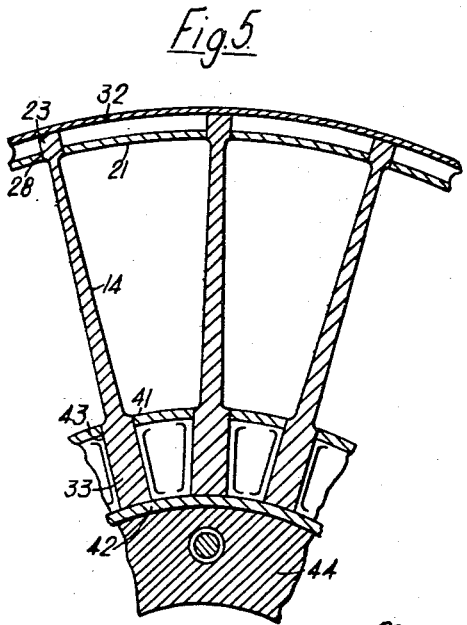

United States Patent Office 3,118,593
Patented Jan. 21, 1964

3,118,593
FLUID FLOW MACHINE
Norman Robert Robinson, Derby, and John Michael Storer Keen, Allestree, Derby, England, assignors to Rolls-Royce Limited, Derby, England, a company of Great Britain
Filed Apr. 17, 1962, Ser. No. 188,059
Claims priority, application Great Britain May 3, 1961
5 Claims. (Cl. 230—116)

This invention concerns fluid flow machines such, for example, as gas turbine engines.

According to the present invention, there is provided a fluid flow machine provided with a ring of angularly spaced apart, substantially radially extending blades, the radially inner and/or the radially outer ends of the blades having their upstream and downstream sides mounted in angularly spaced apart slots in a pair of axially spaced slotted annular members.

The term "blades" is used in this specification in a wide sense to include blade-like members such as inlet guide vanes.

The words "substantially radially extending blades" are to be understood to include both blades which extend truly radially and those which are, for example, tangential to an inner hub member.

In its preferred embodiment, the invention comprises a gas turbine engine provided with a ring of angularly spaced apart inlet guide vanes, the radially inner and/or the radially outer ends of the inlet guide vanes having their upstream and downstream sides mounted in angularly spaced apart slots in a pair of axially spaced slotted members.

Preferably one of the said pair of slotted annular members forms an end wall of a U-section ring having substantially axially extending walls, the other slotted annular member of the said pair extending between and being secured to the said substantially axially extending walls.

Preferably the inlet guide vanes and the said slotted annular members are of synthetic resin material and are bonded to each other.

A pair of slotted annular members are preferably provided at both the radially inner and the radially outer ends of the inlet guide vanes.

The pair of slotted annular members at the radially outer ends of the inlet guide vanes are preferably bonded to the engine casing.

The pair of slotted annular members at the radially inner ends of the inlet guide vanes preferably constitute an outer hub member within which is bonded an inner hub member of synthetic resin material, the inner hub member carrying a bearing for the main shaft of the engine.

The invention is illustrated, merely by way of example in the accompanying drawings, in which:

FIGURE 1 is a diagrammatic view, partly in section, of a gas turbine engine embodying the present invention, FIGURE 2 is a broken away section showing part of the engine of FIGURE 1 on a larger scale, FIGURE 3 is a broken away view looking in the direction of the arrow 3 of FIGURE 2, and FIGURES 4 and 5 are broken away sections taken respectively on the lines 4—4 and 5—5 of FIGURE 2.

In the drawings there is shown a gas turbine engine 10 which is adapted for use as a vertical lift engine in an aircraft and which is of lightweight construction.

The engine 10 has an engine casing 11 within which are disposed in flow series a ring of angularly spaced apart intake struts 12, which support a nose cone 13, a ring of, say, nineteen angularly spaced apart inlet guide vanes 14, a multi-stage axial compressor 15, combustion equipment 16, and a single stage axial turbine 17, the turbine exhaust gases being directed to atmosphere through a jet pipe 18. The turbine 17 and compressor 15 are mounted on a common shaft 20.

The engine casing 11 is, for convenience, shown in FIGURE 1, as a unitary member. In fact, however it is made up of a plurality of parts which include casing members 21, 22 (FIG. 2). The latter are respectively disposed about the inlet guide vanes 14 and the compressor 15 and are formed of reinforced synthetic resin material such, for example, as an epoxy or phenolic resin reinforced with glass fibres.

The intake struts 12, inlet guide vanes 14, and the stator and rotor blades of the compressor 15 are also formed of such reinforced synthetic resin material.

The radially outer ends, or feet, 23 of the inlet guide vanes 14 are of bulbous shape and have their upstream and downstream sides bonded in position within angularly spaced apart slots 24, 25 (FIG. 3) of axially spaced slotted annular members 26, 27 respectively. The slotted annular members 26, 27 are formed of reinforced synthetic resin material and are bonded to the casing member 21, the latter having apertures 28 through which pass the inlet guide vanes 14.

The slotted annular member 27 is connected by a locating peg 30 (FIG. 2) to an annular member 31 of reinforced synthetic resin material, the annular member 31 being bonded to the slotted annular member 27 and to the casing member 22.

The slotted annular members 26, 27 and the annular member 31 are disposed within and bonded to an outer casing member 32 of reinforced synthetic resin material.

The radially inner ends, or roots, 33 of the inlet guide vanes 14 are of bulbous shape and have their upstream and downstream sides bonded in position within angularly spaced apart slots 34, 35 of axially spaced slotted annular members 36, 37 respectively. The slotted annular member 36 constitutes an end wall of a U-section ring 40 (FIG. 2), the latter having axially extending, radially spaced outer and inner walls 41, 42 respectively.

The slotted annular member 37 and the ring 40 are formed of reinforced synthetic resin material, the slotted annular member 37 extending between and being bonded to the outer and inner walls 41, 42 of the ring 40.

The roots 33 pass through apertures 43 (FIG. 5) in the outer wall 41, the inner ends of the roots 33 engaging the inner wall 42.

The ring 40 and slotted annular member 37 collectively constitute an outer hub member within which is bonded an inner hub member 44 of reinforced synthetic resin material. Bonded within the inner hub member 44 is a bearing housing 45 of reinforced synthetic resin material.

The shaft 20 is mounted within a thrust bearing 46 having an outer race 47 which is splined within the bearing housing 45. A spring 50 is mounted within the bearing housing 45 and urges the outer race 47 in a downstream direction.

Bolted to the inner hub member 44 is an annular sealing plate 51 having a labyrinth seal 52 for sealing the shaft 20 to the plate 51.

We claim:
1. A gas turbine engine comprising: an engine casing, a first pair of axially spaced annular members each having angularly spaced apart slots therein, said annular members being mounted within and bonded to said engine casing, a ring of angularly spaced apart inlet guide vanes, each of said guide vanes having upstream and downstream sides whose radially outer ends are respectively bonded within the slots in said first pair of slotted annular members, a second pair of axially spaced annular members each having angularly spaced apart slots therein, said second pair of annular members having the radially inner ends of the upstream and downstream sides of said inlet guide vanes bonded within the slots thereof, a bearing mounted inwardly of and carried by said second pair of slotted annular members, a shaft rotatably mounted within said bearing, and a compressor and turbine mounted on said shaft.

2. A gas turbine engine comprising: an engine casing, a first pair of axially spaced annular members each having angularly spaced apart slots therein, said annular members being mounted within and bonded to said engine casing, a ring of angularly spaced apart inlet guide vanes, each of said guide vanes having upstream and downstream sides whose radially outer ends are respectively bonded within the slots in said first pair of slotted annular members, a second pair of axially spaced annular members each having angularly spaced apart slots therein, said second pair of annular members having the radially inner ends of the upstream and downstream sides of said inlet guide vanes bonded within the slots thereof, one of said second pair of slotted annular members forming an end wall of a U-section ring having substantially axially extending walls, and the other of said second pair of slotted annular members extending between and being bonded to the substantially axially extending walls of said U-section ring, a bearing mounted inwardly of and carried by the said second pair of slotted annular members, a shaft rotatably mounted within said bearing, and a compressor and turbine mounted on said shaft.

3. A gas turbine engine comprising: an engine casing, a first pair of axially spaced annular members each having angularly spaced apart slots therein, said annular members being mounted within and bonded to said engine casing, a ring of angularly spaced apart inlet guide vanes, each of said guide vanes having upstream and downstream sides whose radially outer ends are respectively bonded within the slots in said first pair of slotted annular members, a second pair of axially spaced annular members each having angularly spaced apart slots therein, said second pair of annular members having the radially inner ends of the upstream and downstream sides of said inlet guide vanes bonded within the slots thereof, one of said second pair of slotted annular members forming an end wall of a U-section ring having substantially axially extending walls, and the other of said second pair of slotted annular members extending between and being bonded to the substantially axially extending walls of said U-section ring, a bearing mounted inwardly of and carried by the said second pair of slotted annular members, a shaft rotatably mounted within said bearing, and a compressor and turbine mounted on said shaft, said engine casing and said first and second pairs of slotted annular members, and said inlet guide vanes all being formed of a synthetic resin material and when bonded together forming an integral structure.

4. A gas turbine engine comprising: an engine casing, a first pair of axially spaced annular members each having angularly spaced apart slots therein, said annular members being mounted within and bonded to said engine casing, a ring of angularly spaced apart inlet guide vanes, each of said guide vanes having upstream and downstream sides whose radially outer ends are respectively bonded within the slots in said first pair of slotted annular members, a second pair of axially spaced annular members each having angularly spaced apart slots therein, said second pair of annular members having the radially inner ends of the upstream and downstream sides of said inlet guide vanes bonded within the slots thereof, a hub member mounted within and bonded to said second pair of slotted annular members, a bearing mounted within and carried by said hub member, a shaft rotatably mounted within said bearing, a compressor and turbine mounted on said shaft, said engine casing and said first and second pairs of slotted annular members and said inlet guide vanes and said hub member all being formed of a synthetic resin material and when bonded together forming an integral structure.

5. A gas turbine engine as claimed in claim 4 including an inner engine casing formed of synthetic resin material and having angularly spaced apart apertures for receiving radially outer ends of said inlet guide vanes, said inner engine casing being bonded to said first pair of axially spaced annular members in spaced relationship to said first mentioned engine casing.

References Cited in the file of this patent

UNITED STATES PATENTS

| | | |
|---|---|---|
| 2,722,373 | Ledwith et al. | Nov. 1, 1955 |
| 2,747,367 | Savin | May 29, 1956 |
| 2,834,537 | Neary | May 13, 1958 |
| 2,857,093 | Warnken | Oct. 21, 1958 |
| 2,951,631 | Gregory | Sept. 6, 1960 |
| 2,999,670 | Payne et al. | Sept. 12, 1961 |